(12) United States Patent
Chen

(10) Patent No.: US 11,044,399 B2
(45) Date of Patent: *Jun. 22, 2021

(54) VIDEO SURVEILLANCE SYSTEM

(71) Applicant: BEIJING HENGFENGZHIYUAN TECHNOLOGY CO., LTD., Beijing (CN)

(72) Inventor: Yu Chen, Shenzhen (CN)

(73) Assignee: BEIJING HENGFENGZHIYUAN TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/731,101

(22) Filed: Dec. 31, 2019

(65) Prior Publication Data

US 2020/0154046 A1 May 14, 2020

(30) Foreign Application Priority Data

Dec. 25, 2019 (CN) .......................... 201911351802.6

(51) Int. Cl.
*H04N 5/00* (2011.01)
*H04N 5/232* (2006.01)
*G06K 9/00* (2006.01)
*H04N 7/18* (2006.01)

(52) U.S. Cl.
CPC ..... *H04N 5/23238* (2013.01); *G06K 9/00744* (2013.01); *G06K 9/00771* (2013.01); *H04N 7/181* (2013.01)

(58) Field of Classification Search
CPC .............. H04N 7/181; H04N 5/23238; G06K 9/00744; G06K 9/00771
See application file for complete search history.

(56) References Cited

U.S. PATENT DOCUMENTS

| | | | | |
|---|---|---|---|---|
| 2015/0244756 | A1* | 8/2015 | Liu | H04L 67/18 709/217 |
| 2016/0071314 | A1* | 3/2016 | Nordstoga | G06T 19/003 345/427 |
| 2017/0236249 | A1* | 8/2017 | Roulet | G06T 5/002 382/275 |
| 2018/0213185 | A1* | 7/2018 | Zeng | G06K 9/00771 |
| 2018/0229669 | A1* | 8/2018 | McKibben | B60R 11/04 |
| 2019/0089940 | A1* | 3/2019 | Zhang | H04N 13/398 |
| 2019/0132576 | A1* | 5/2019 | Zhang | H04N 13/232 |
| 2020/0034645 | A1* | 1/2020 | Fan | G06T 1/0014 |
| 2020/0244942 | A1* | 7/2020 | Maze | H04N 21/84 |

* cited by examiner

*Primary Examiner* — Zhihan Zhou

(57) ABSTRACT

In the video surveillance system of the present invention, Because the multi-channel surveillance videos are integrated into a virtual surveillance scene for panoramic viewing, it is possible to view surveillance videos from the plurality of channels at the same time, reduce the viewing time, and improve the efficiency. In addition, since the surveillance picture is not much different within the same second or even a few seconds, and in the present invention, one frame of image is extracted at the same time point for a video of the multi-channel surveillance videos, and a next frame of image is extracted after a predetermined time interval, instead of extracting all the images to have a view, and thus it is possible to improve the efficiency and not to miss important video information.

5 Claims, 4 Drawing Sheets

VIDEO SURVEILLANCE SYSTEM

TECHNICAL FIELD

The present invention relates to the field of intelligent surveillance technology, and more specifically, to an intelligent video surveillance system with improved efficiency.

BACKGROUND

Video surveillance is the basis for real-time surveillance of key departments or important places in various industries. Management departments can utilize video surveillance to obtain effective video information and timely monitor and record the process of sudden abnormal events to provide efficient and timely command and dispatch, deploy police forces, handle cases, etc. However, viewing surveillance videos is often time-consuming and laborious. For example, if the video surveillance of a place is implemented through six-channel surveillance cameras, it is necessary to view surveillance videos from the six channels to have a view of the surveillance videos. It takes a lot of time even if six persons are arranged to view the videos. In addition, a lot of time in the surveillance video is useless, but in order to find valuable clues, in the prior art, the video viewers have to manually view every detail, which spends lots of useless effort. Furthermore, a video viewer cannot view surveillance videos from the six channels at the same time, and thus he/she cannot grasp the situation of the place under surveillance from a global perspective. In addition, human eyes are tired due to long-time viewing of video viewers and important video information and key video details tend to be missed.

SUMMARY

The technical problem to be solved by the present invention is to provide an intelligent video surveillance system, which can achieve viewing surveillance videos from a plurality of channels at the same time, reduce viewing time, make the video information and video details in the videos that are of interest to human eyes salient and improve the efficiency.

To solve the above technical problems, the present invention adopts the following technical solutions:

A video surveillance system, comprising:

a surveillance processing module, comprising a plurality of surveillance cameras, each of which conduct surveillance according a surveillance angle;

an acquiring processing module, for acquiring surveillance videos, wherein the surveillance videos comprise videos from a plurality of channels;

an image extracting processing module, for extracting first frames of images of the videos from the plurality of channels at a same starting point of view time, and extracting next frames of images after a same predetermined time interval, and then continuing with extracting until last frames of images are extracted at a same ending point of view time;

a visual interest detecting processing module, for grouping images extracted from the videos from the plurality of channels at a same time point into a group of images, and performing visual interest detection on each group of images to obtain a visual image of interest corresponding to the group;

a stitching processing module, for stitching the visual images of interest of each group into a panoramic image;

a virtual surveillance scene processing module, for converting all panoramic images into corresponding virtual surveillance scenes; and a viewing processing module, for performing the viewing in the virtual surveillance scenes through a panoramic display.

Compared with the prior art, the present invention has the following beneficial effects:

In the video surveillance system of the present invention, the images of videos from the plurality of channels extracted at the same time point are combined into a group of images, and the visual interest detection is performed on each group of images to obtain the visual image of interest corresponding to the group; the visual images of interest of each group are stitched into a panoramic image; all the panoramic images are converted into corresponding virtual surveillance scenes; and the viewing is performed in the virtual surveillance scenes through a panoramic display, by the respective processing modules. Because the multi-channel surveillance videos are integrated into a virtual surveillance scene for panoramic viewing, it is possible to view surveillance videos from the plurality of channels at the same time, reduce the viewing time, and improve the efficiency. In addition, since the surveillance picture is not much different within the same second or even a few seconds, and in the present invention, one frame of image is extracted at the same time point for a video of the multi-channel surveillance videos, and a next frame of image is extracted after a predetermined time interval, instead of extracting all the images to have a view, and thus it is possible to improve the efficiency and not to miss important video information. In addition, in the present invention, the extracted images are processed to obtain visual images of interest, which is advantageous to make the video information and video details in the videos that are of interest to human eye salient and also improve the efficiency.

DETAILED DESCRIPTION

Figure 1:
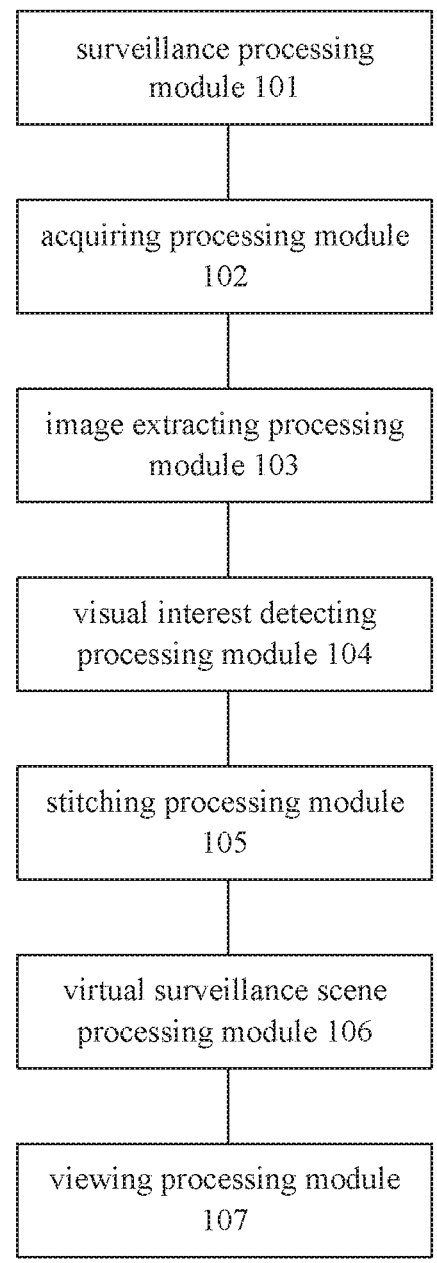
FIG. 1 is a block diagram of a first embodiment of a video surveillance system according to the present invention.

Reference is now made to FIG. 1, which is a block diagram of a specific embodiment of a video surveillance system according to the present invention. The system in this embodiment mainly comprises the following modules: a surveillance processing module 101, an acquiring processing module 102, an image extracting processing module 103, a visual interest detecting processing module 104, a stitching processing module 105, a virtual surveillance scene processing module 106 and a viewing processing module 107, wherein the surveillance processing module 101 comprises a plurality of surveillance cameras, each of which conduct surveillance according a surveillance angle;

the acquiring processing module 102 is mainly configured for acquiring surveillance videos. The surveillance videos comprise videos from a plurality of channels. In a specific implementation, the surveillance coverage of each video from each channel may be overlapped or may not be overlapped. This embodiment is illustrated with the surveillance coverage being overlapped as an example.

The image extracting processing module 103 is mainly configured for extracting first frames of images of the videos from the plurality of channels at a same starting point of view time, and extracting next frames of images after a same predetermined time interval, and then continuing with extracting until last frames of images are extracted at a same ending point of view time. In a specific implementation, for different surveillance video transmission protocols, video frames transmitted per second are different. For example, 24 frames of images per second are transmitted. In the present invention, it is not necessary to extract all 24 frames, because practically the images transmitted per second have no much difference in video content, and even the images in a range of several seconds are similar. Therefore, in the present invention, the predetermined time interval can be set according to the actual situation. For example, the predetermined time interval may be set to one second, that is, one frame of an image is extracted per second for each channel. Alternatively, the predetermined time interval may be set to 3 seconds, that is, one frame of an image is extracted every 3 seconds for each channel. In addition, before extracting the images, the timing of the respective videos needs to be synchronized to avoid that the image videos are extracted at different times, which is not elaborated herein.

Figure 2:
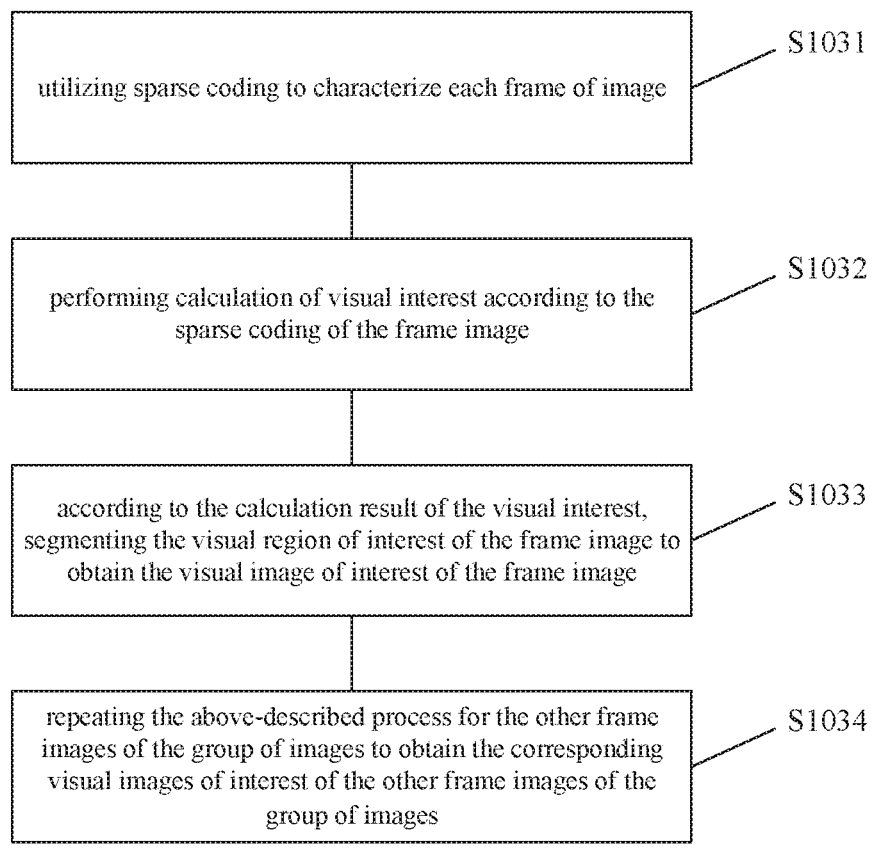
FIG. 2 is a flowchart of a specific embodiment of performing detection by the visual interest detecting processing module of the video surveillance system according to the present invention.

The visual interest detecting processing module 104 is mainly configured for grouping images extracted from the videos from the plurality of channels at a same time point into a group of images, and performing visual interest detection on each group of images to obtain a visual image of interest corresponding to the group. The visual image of interest obtained in this embodiment facilitates improvement of object recognition in the surveillance scene when viewing the videos. In addition, in the prior art, the visual interest is obtained by calculating the feature contrast of the image region relative to its surrounding neighborhood, and the calculation efficiency is low. In contrast, as a preferred embodiment, referring to FIG. 2, an improved method is used by the visual interest detecting processing module 104 for detection in this embodiment. Specifically, the visual interest image of each group in this embodiment is detected and obtained in the following manner:

First in step S1031, sparse coding is utilized to characterize each frame of image;

In step S1032, calculation of visual interest is performed according to the sparse coding of the frame image;

In step S1033, according to the calculation result of the visual interest, the visual region of interest of the frame image is segmented to obtain the visual image of interest of the frame image;

In step S1034, the above-described process is repeated for the other frame images of the group of images to obtain the corresponding visual images of interest of the other frame images of the group of images. In this embodiment, the sparse coding of the image is used to calculate the visual saliency, which can improve the calculation efficiency, and is not repeated here.

Figure 3:
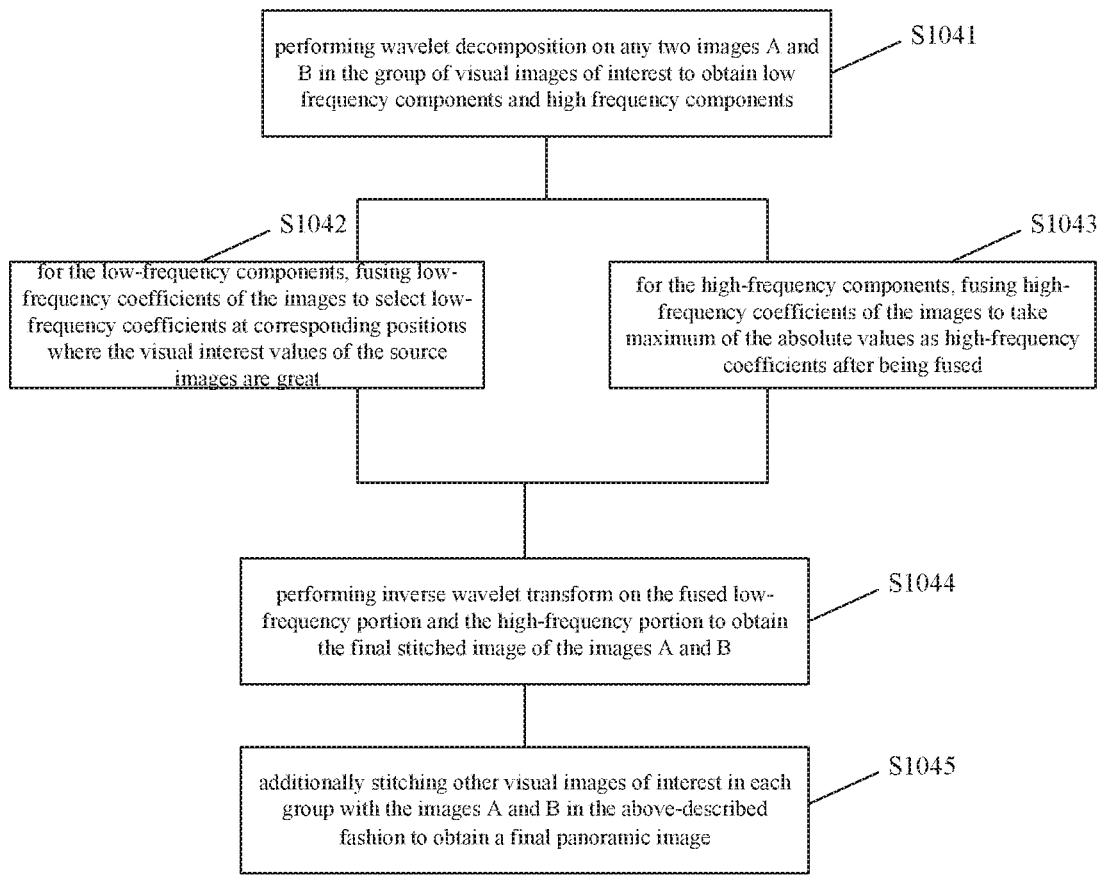
FIG. 3 is a flowchart of a specific embodiment of stitching a panoramic image by the stitching processing module of the video surveillance system according to the present invention.

In addition, the stitching processing module 105 in this embodiment is mainly configured for stitch the visual images of interest of each group into a panoramic image. In a specific implementation, as a preferred embodiment, referring to FIG. 3, stitching the visual images of interest of each group into a panoramic image by the stitching processing module 105 in this embodiment comprises the following steps:

In step S1041, wavelet decomposition is performed on any two images A and B in the group of visual images of interest to obtain low frequency components and high frequency components;

In step S1042, for the low-frequency components, low-frequency coefficients of the images are fused to select low-frequency coefficients at corresponding positions where the visual interest values of the source images are great;

In step S1043, for the high-frequency components, high-frequency coefficients of the images are fused to take maximum of the absolute values as high-frequency coefficients after being fused;

In step S1044, inverse wavelet transform is performed on the fused low-frequency portion and the high-frequency portion to obtain the final stitched image of the images A and B;

In step S1045, other visual images of interest in each group are additionally stitched with the images A and B in the above-described fashion to obtain a final panoramic image;

It should be noted that, in the prior art, when image fusion is performed using wavelet transformation, image fusion is performed on each decomposition layer respectively. However, for low frequency portion, when the number of decomposition layers is low, the image contrast will degrade. In contrast, in the present embodiment, a visual interest based fusion algorithm is adopted for the low-frequency components, which can fuse the details of the source images together with a better fusion effect and not elaborated herein.

In addition, the virtual surveillance scene processing module 106 in this embodiment is mainly configured for converting all the panoramic images into a corresponding virtual surveillance scene. In a specific implementation, a panoramic image is a basic unit constituting a virtual surveillance scene. In the prior art, the corresponding virtual surveillance scene may be converted using a cube mode, a spherical mode, and a cylindrical mode. In this embodiment, the cylindrical mode is used, that is, the panoramic images are stitched into a cylindrical shape centered on the camera viewpoint, so that a 360-degree ring-view of the line of sight can be achieved in the horizontal direction, and the rotation angle of the line of sight in the vertical direction is less than 180 degrees, which is not elaborated herein;

In addition, the viewing processing module 107 in this embodiment is mainly configured for performing the viewing in the virtual surveillance scenes through a panoramic display. In a specific implementation, the viewing performed in the virtual surveillance scene through a panoramic display by the viewing processing module 107 is performed such that the viewing is performed according to a set automatic roaming path, for example, after viewing according to 360-degree panoramic rotation, then viewing the next virtual surveillance scene;

In the above embodiment, the surveillance videos from multi-channels are integrated into a virtual surveillance scene for being viewed by means of virtual reality, which may achieve simultaneously viewing the surveillance videos from multi-channels, reducing viewing time, and improving viewing efficiency.

Figure 4:
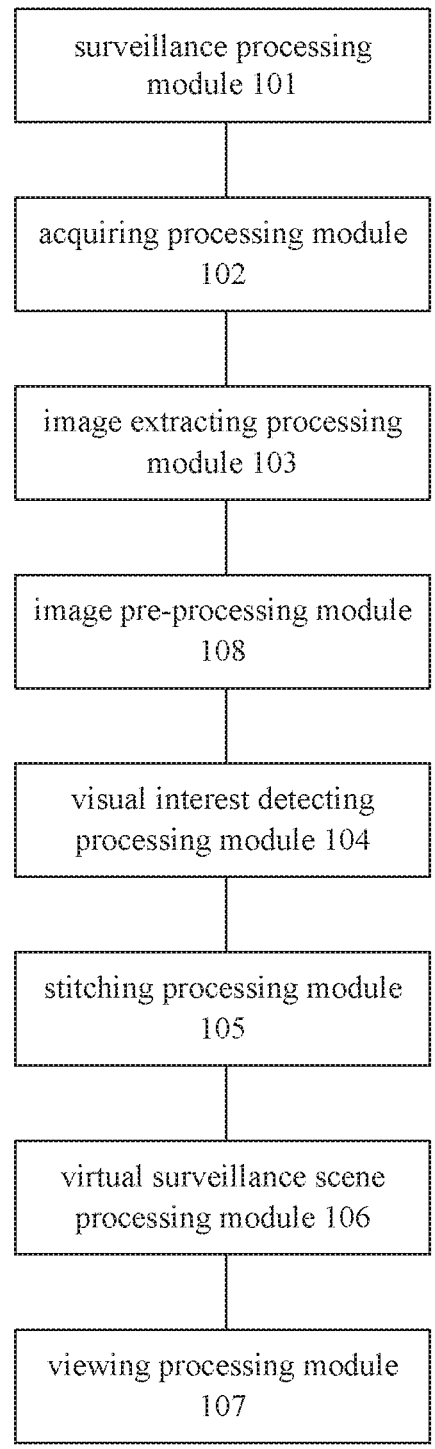
FIG. 4 is a block diagram of a second embodiment of a video surveillance system according to the present invention.

In addition, in the surveillance videos, viewers need to focus on moving objects, but do not need to focus much on stationary objects or only on slightly moving objects. As a preferred embodiment, referring to FIG. 4, this embodiment differs from the above embodiment in that it further comprises an image pre-processing module 108, which adopts the following manners to pre-process the surveillance video images used in the virtual surveillance scenes, that is, before grouping the images extracted from the videos from the plurality of channels at a same time point into a group of images, following pre-processing is further performed:

21) establishing a background image a (x, y) using a first frame of image from the images extracted from a surveillance video from each channel. In a specific implementation, Gaussian model method may be used to perform modeling, wherein x is the horizontal ordinate in the Gaussian coordinate system, and y is vertical ordinate in the Gaussian coordinate system;

22) performing median filtering, edge enhancement, and binarization on the background image a (x, y) to obtain an image A (x, y) computed from the background image a (x, y);

23) similarly, performing median filtering, edge enhancement and binarization on a second frame of image from the images extracted from the surveillance video from each channel to obtain an image B (x, y) computed from the second frame of image;

24) performing a difference operation on the image A (x, y) and the image B (x, y) to obtain D (x, y)=B (x, y)−A (x, y);

25) if the number N of points with a value of 1 in D (x, y) is less than a threshold T, it is determined that no moving object is detected; and if the number N is greater than or equal to the threshold T, it is determined that a moving object is detected, and then D (x, y) is traversed to find points with a value of 1. The pixel values of the corresponding positions of B (x, y) are set to 0 as a moving target region, and the pixel values of other positions are kept unchanged, to get an image of a salient moving target region corresponding to the second frame of image. In a specific implementation, the value of 1 in of D (x, y) represents a moving region. However, in this embodiment, the threshold value T is set, and only if the number N of points with a value of 1 in D (x, y) is greater than or equal to the threshold T, it is determined that a moving object is detected, and when the number N of points with a value of 1 in D (x, y) is less than the threshold T, it means that although there is a moving object, it only moves slightly, which can be considered as no moving object detected. In practice, the threshold T may be adjusted according to the purpose of viewing the surveillance videos. When it is necessary to detect a small movement, the threshold T can be adjusted to be decreased. When a small movement can be ignored, the threshold T can be adjusted to be increased. The value of the threshold T is not specifically limited. In addition, in this embodiment, B (x, y) is a binary image, the positions in B (x, y) where pixel values are set to 0 represent the salient portions or foreground portions, and the corresponding positions where pixel values are set to 255 are background portion. By superimposing the B (x, y) and the original image, an image with a salient moving object region relative to the original image may be obtained, which is not elaborated herein;

26) the remaining other images extracted from the surveillance video from each channel are processed in accordance with steps 23)-25) to obtain corresponding other images with salient moving object regions.

In summary, according to the video surveillance system of the present invention, on the one hand, the viewing time can be reduced. For example, if a viewer is to view the cars that may scratch other cars in the parking lot, in the prior art, if the three-channel surveillance videos are used and the video from each channel is 3 hours, he/she needs to view 9 hours. In contrast, in the present invention, it only takes 3 hours, or even 1 hour or less. In addition, there is no need to focus much on the still pictures. In the present invention, by pre-processing the extracted images by the image pre-processing module 108 as described above, the moving picture when the vehicle is moving becomes salient, and it is convenient for the viewers to quickly find the desired key video information, and viewing efficiency is thus improved.

The above are only the preferred embodiments of the present invention and are not intended to limit the present invention. Any modification, equivalent replacement, or improvement made within the spirit and principle of the present invention shall be included in the scope of present invention.

The invention claimed is:

1. A video surveillance system, comprising:
a surveillance processing module, comprising a plurality of surveillance cameras, each of which conduct surveillance according a surveillance angle;
an acquiring processing module, for acquiring surveillance videos, wherein the surveillance videos comprise videos from a plurality of channels;
an image extracting processing module, for extracting first frames of images of the videos from the plurality of channels at a same starting point of view time, and extracting next frames of images after a same predetermined time interval, and then continuing with extracting until last frames of images are extracted at a same ending point of view time;
a visual interest detecting processing module, for grouping images extracted from the videos from the plurality of channels at a same time point into a group of images, and performing visual interest detection on each group of images to obtain a visual image of interest corresponding to the group;
a stitching processing module, for stitching the visual images of interest of each group into a panoramic image;
a virtual surveillance scene processing module, for converting all panoramic images into corresponding virtual surveillance scenes; and
a viewing processing module, for performing the viewing in the virtual surveillance scenes through a panoramic display;
wherein the system further comprises an image pre-processing module, which adopts the following manners to pre-process the extracted images:
21) establishing a background image a (x, y) using a first frame of image from the images extracted from a surveillance video from each channel;
22) performing median filtering, edge enhancement, and binarization on the background image a (x, y) to obtain an image A (x, y) computed from the background image a (x, y);
23) similarly performing median filtering, edge enhancement and binarization on a second frame of image from the images extracted from the surveillance video from each channel to obtain an image B (x, y) computed from the second frame of image;
24) performing a difference operation on the image A (x, y) and the image B (x, y) to obtain D (x, y)=B (x, y)−A (x, y);
25) if the number N of points with a value of 1 in D (x, y) is less than a threshold T, it is determined that no moving object is detected; and if the number N is greater than or equal to the threshold T, it is determined that a moving object is detected, and then D (x, y) is traversed to find points with a value of 1, and the pixel values of the corresponding positions of B (x, y) are set to 0 as a moving target region, and the pixel values of other positions are kept unchanged, to get an image of a salient moving target region corresponding to the second frame of image;

26) processing the remaining other images extracted from the surveillance video from each channel in accordance with steps 23)-25) to obtain corresponding other images with salient moving object regions.

2. The system according to claim 1, wherein the visual interest detecting processing module obtains the visual image of interest of each group in the following manner:

utilizing sparse coding to characterize each frame of image;

performing calculation of visual interest according to the sparse coding of the frame image;

according to the calculation result of the visual interest, segmenting the visual region of interest of the frame image to obtain the visual image of interest of the frame image; and repeating the above-described process for the other frame images of the group of images to obtain the corresponding visual images of interest of the other frame images of the group of images.

3. The system according to claim 1, wherein the stitching processing module performs the stitching in the following manner:

performing wavelet decomposition on any two images A and B in the group of visual images of interest to obtain low frequency components and high frequency components;

for the low-frequency components, fusing low-frequency coefficients of the images to select low-frequency coefficients at corresponding positions where the visual interest values of the source images are great;

for the high-frequency components, fusing high-frequency coefficients of the images to take maximum of the absolute values as high-frequency coefficients after being fused;

performing inverse wavelet transform on the fused low-frequency portion and the high-frequency portion to obtain the final stitched image of the images A and B;

additionally stitching other visual images of interest in each group with the images A and B in the above-described fashion to obtain a final panoramic image.

4. The system according to claim 1, wherein the viewing processing module performs the viewing such that the viewing is performed according to a set automatic roaming path.

5. The system according to claim 1, wherein the predetermined time interval is 1 second.

* * * * *